Dec. 23, 1924. 1,520,620
A. W. WALL
INTERNAL COMBUSTION ENGINE
Filed July 5, 1923  2 Sheets-Sheet 1
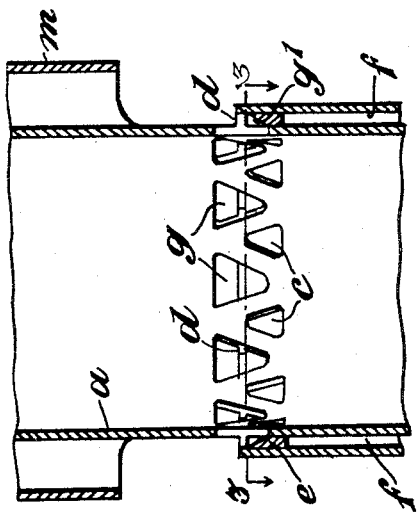
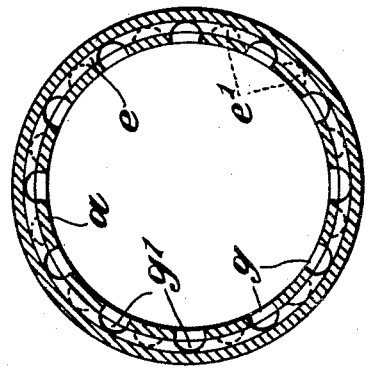
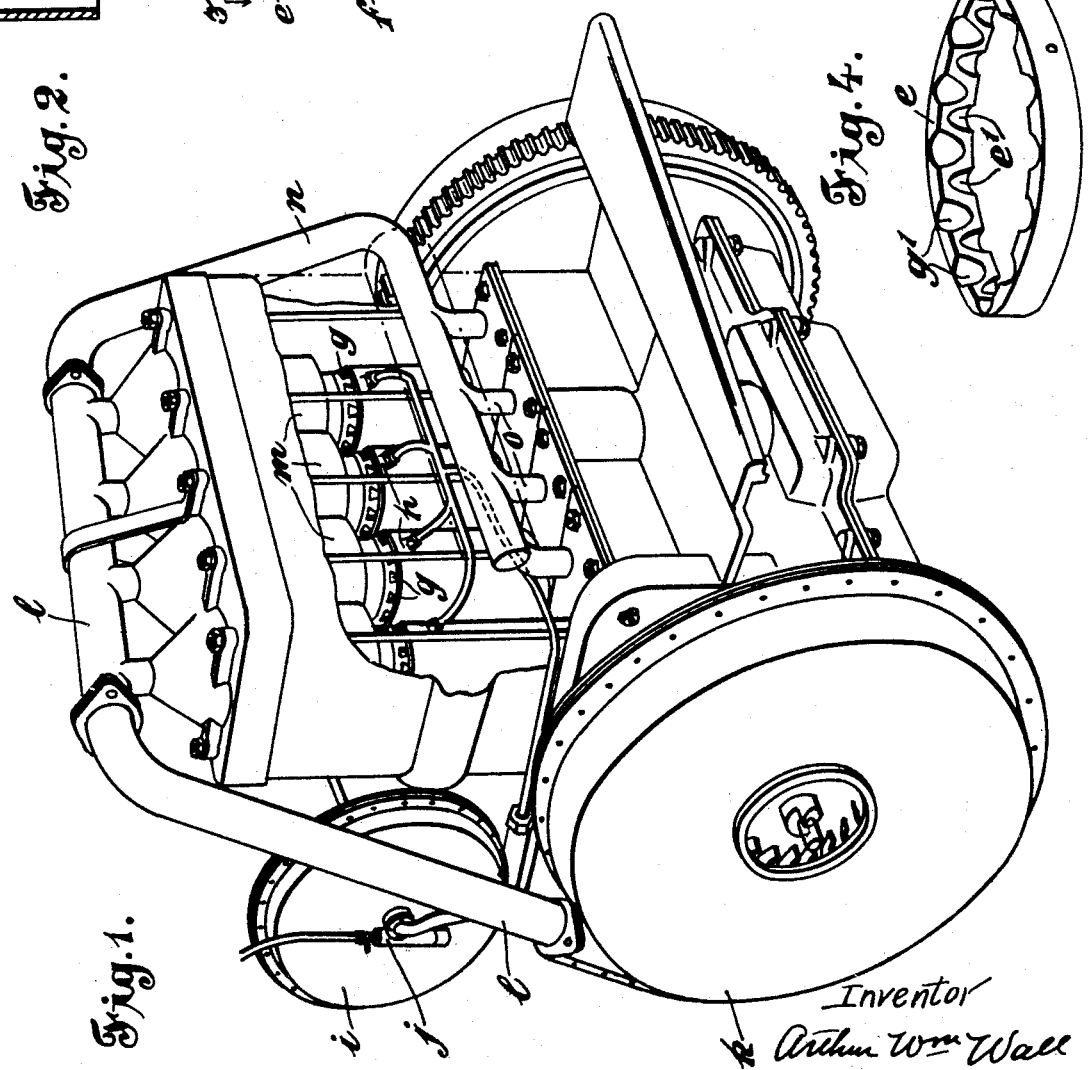
Inventor
Arthur Wm Wall
by B Singer Atty Patented Dec. 23, 1924.

1,520,620

UNITED STATES PATENT OFFICE.

ARTHUR WILLIAM WALL, OF SHELDON, NEAR BIRMINGHAM, ENGLAND, ASSIGNOR OF THREE-FOURTHS TO JOHN WHITE, OF BIRMINGHAM, ENGLAND.

INTERNAL-COMBUSTION ENGINE.

Application filed July 5, 1923. Serial No. 649,653.

*To all whom it may concern:*

Be it known that I, ARTHUR WILLIAM WALL, a subject of the Kingdom of Great Britain, residing at The Laurels, Lyndon End, Sheldon, near Birmingham, in the county of Warwick, England, have invented certain Improvements in or Relating to Internal-Combustion Engines, of which the following is a specification.

This invention is for improvements in or relating to internal-combustion engines, and more particularly to internal-combustion engines of the two-stroke type, and it has for its object the provision of an internal-combustion engine wherein the exhaust openings and the inlet openings are so arranged around the cylinder that a maximum exhaustive effect is produced immediately the exhaust openings are uncovered by the piston, and after a relatively small movement of the piston the same uncovers the inlet openings to permit of fuel being drawn or forced into the cylinder.

It will be appreciated that in order to obtain the maximum exhaustive effect in the cylinder immediately the piston has uncovered the exhaust openings, the said openings should be of the greatest area possible, and, theoretically, this would be produced if that portion of the exhaust openings which is first uncovered by the piston extended around the whole of the inner surface of the cylinder.

As it is impossible, in practice, to secure an exhaust opening of such a large initial area, it is found necessary to provide a plurality of exhaust openings around the cylinder, those portions of which are initially uncovered by the piston on its down-stroke being situated so close together that, from an engineering point of view, the exhaust openings form a substantially continuous exhaust around the cylinder.

However, as it is essential that the inlet openings should be uncovered almost as soon as the exhaust openings have been uncovered, it is necessary that a portion of the inlet openings should be situated near to the upper portion of the exhaust openings.

According to one internal-combustion engine constructed according to the present invention, it has been found that excellent results are obtained if the exhaust openings and the inlet openings are arranged to overlap one another in the direction of the longitudinal axis of the cylinder, with the exhaust openings arranged to converge downwardly, and the inlet openings located intermediately of the exhaust openings, and arranged to converge upwardly.

With this arrangement it is found that a very large exhaust opening is provided immediately the upper portion of the exhaust openings are uncovered by the piston, and by a further movement of the piston a small portion of the inlet openings is first uncovered, the said portion of each inlet being of comparatively small area, and acting as a jet for the explosive mixture which is admitted to the cylinder, either from a precompression chamber, or from a precompression chamber and a suitable set of fuel inlet nozzles arranged in close proximity to the said inlet openings, and directed so as to force fuel through the said inlet openings.

In conjunction with the above arrangement, the internal-combustion engine according to the present invention, is constructed so that a fluid blanket, for example, a blanket of air, is arranged to be directed past the exhaust openings in the cylinder, which blanket, when the initial opening of the exhaust ports is effected, is punctured, so to speak, by the out-flow of exhaust gases, and acts as a screen to prevent these gases from being drawn back once they have been forced through the blanket.

Again, the blanket which is directed past the exhaust openings acts as a source of air supply to the cylinder, in as much as when a high vacuum has been produced in the cylinder by the rush of exhaust gases, the air of the blanket will be drawn in through the exhaust openings, and mix thoroughly with the fuel supply passing through the inlet openings. The air blanket hereinbefore referred to, besides performing the function of a screen for the exhaust gases, emitted from the cylinder, also forms the air supply for the fuel admitted through the fuel inlet, and acts as a cooling medium for the cylinder itself, inasmuch as the blanket may be directed downwardly around the cylinder by means of an outer casing, or an air current may be directed downwardly and one upwardly into the vicinity of the exhaust openings, and the air supply for the blanket may be passed, by means of a suitable conduit, into the interior of the piston, where it would act as a cooling medium upon the same.

In order that the present invention may be thoroughly understood, reference may be had to the appended drawings, which illustrate one method of carrying the invention into effect, and in which:—

Figure 1 is a perspective view of an engine constructed according to the present invention.

Figure 2 is a part sectional elevation of a portion of the engine shown in Figure 1.

Figure 3 is a sectional plan view on the line 3—3 of Figure 2.

Figure 4 illustrates separately a detail of the structure shown in Figures 1, 2 and 3.

Figure 5:
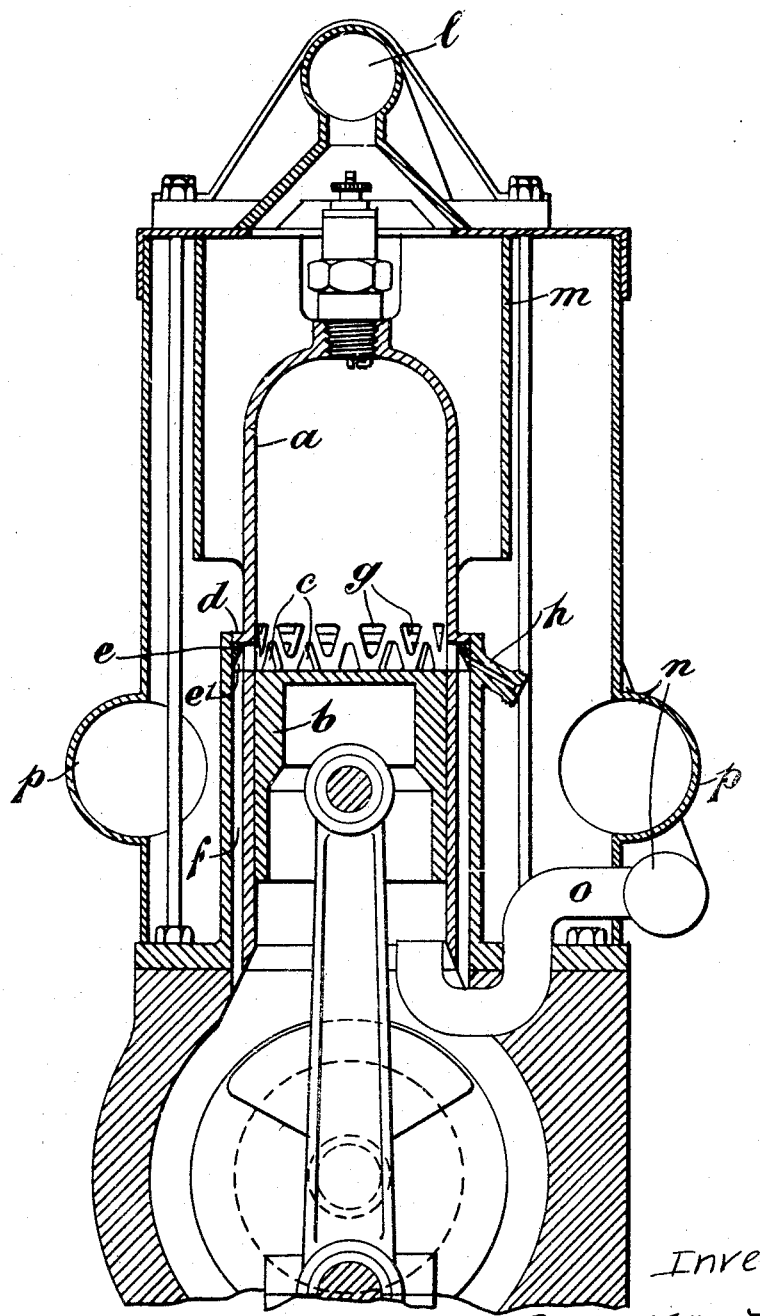
Figure 5 is a vertical section of one complete engine.

Referring to the drawings, which illustrate a convenient embodiment of the present invention, $a$ is a cylinder, in which is adapted to slide a piston $b$. Arranged around the cylinder, so as to lie transverse to the longitudinal axis thereof, are a series of exhaust openings $g$, which are of substantially triangular formation, the sides of which are arranged to converge downwardly. Arranged intermediately between the said exhaust openings $g$, are a corresponding number of inlet openings $c$, of substantially triangular formation, the sides of which are arranged to converge upwardly.

It will be observed that the inlet openings $c$ are arranged to overlap, in the direction of the longitudinal axis of the cylinder $a$, the exhaust openings $g$. The cylinder $a$ is provided with an outwardly directed flange $d$, which is situated above the inlet openings $c$, and is notched so as to produce a series of projections around the outer surface of the cylinder $a$. Below the flange $d$, there is provided an annulus $e$, as illustrated in Figure 4, having a series of notches $e'$ formed on the internal surface thereof, which are arranged to communicate with the inlet openings $c$. The annulus $e$ is arranged to engage with a series of conduits $f$ leading to the crank-chamber, which, in the engine illustrated, comprises a precompression chamber. The exhaust openings $g$ are arranged to extend above and below the flange $d$, and are adapted to communicate with a second set of notches $g^1$ formed in the annulus $e$. It will therefore be seen that by means of the annulus $e$, the faces of the exhaust openings $g$ and intake $c$ on the exterior surface of the cylinder $a$, are isolated from one another. The notches $g^1$ are arranged to communicate with the space encircling the cylinder $a$. Formed around the cylinder $a$ is an outer housing $m$, which is connected, by means of the conduit $l$, to a rotary blower $k$, which is operable to supply air to the housing $m$. The fuel may be supplied to the inlets $c$ through the nozzles $h$, which are arranged around the cylinder, and in close proximity to the inlet openings $c$, so as to direct fuel through the said inlet openings $c$ into the cylinder $a$, the said nozzles $h$ being in communication with a blower $i$ provided with a carburetter $j$. Or the fuel may be supplied to the inlets $c$ from the crank-case, which in such circumstances comprises a precompression chamber, the fuel being drawn by the suction of the engine through the conduits $f$. The conduit $l$ is arranged in communication with a second conduit $n$, which is provided with a plurality of extensions $o$, arranged to communicate with the underside of the piston $b$ of each cylinder. When, however, the fuel is obtained from the crank-case, as hereinbefore mentioned, it is desirable that the supply of air through the extensions $o$ should be cut off, and for this purpose suitable means, for example, a tap or valve, is provided in the said extensions, or in the conduit $n$, so as to cut off the supply of air to the underside of the cylinder.

It will be appreciated that an upwardly directed air blanket may be formed around the cylinder, in which case an outer housing, similar to the housing $m$, is provided around the lower portion of the cylinder, the upwardly and downwardly directed air blankets meeting at a point adjacent to the exhaust openings, whereafter the air and the exhaust gases from the exhaust openings $g$ are led away through suitable conduits $p$.

It will be appreciated that the fuel supplied to the inlet openings $c$ may be secured both from the nozzles $h$ and the precompression chamber, hereinbefore referred to.

Thus it will be seen that when the engine hereinbefore described is in motion, the piston $b$ will, at a point along its downward path, uncover the exhaust openings $g$, and, due to the shape of these openings, the maximum exhaust opening possible is secured, whereby the cylinder will have completely exhausted itself upon a very small movement of the piston, and the exhaust gases will, due to the force with which they are expelled from the cylinder, puncture the air blanket which is continually passing over the exhaust openings, so that by the time that the piston reaches the uppermost points of the inlet openings $c$, a high state of vacuum will have been produced in the cylinder $a$, causing air to be drawn through the exhaust opening $g$ from the air blanket surrounding the cylinder, which will form a very rich mixture with the fuel which is passed through the extremely small opening formed at the apex of the inlet openings $c$, and, due to the shape of these openings, the fuel will be forced into the cylinder at great pressure in the form of a plurality of jets.

Due to the constant stream of air passing down around the sparking-plug and cylinder to form the air blanket, and the current of air which is forced through the conduit $o$ to the underside of the piston $b$, it will be found that the plug and the cylinder are extremely cool, and that a very high state of efficiency is obtained with the engine under consideration.

It is particularly pointed out that although the blanket which is arranged to be directed past the exhaust opening hereinbefore has been particularly referred to as air, nevertheless, the same might constitute an explosive mixture, in which case it will be found that the fuel supplied to the inlet openings can be cut off altogether, and the engine will continue to run on the charge drawn merely through the exhaust openings after the exhaust gases have been driven through the blanket of fuel.

Having now particularly described and ascertained the nature of my said invention, and in what manner the same is to be performed, I declare that what I claim is:—

1. An internal-combustion engine, which comprises, in combination, a cylinder and a piston arranged to reciprocate in said cylinder, said cylinder having exhaust openings arranged therearound in a direction transverse to the longitudinal axis and inlet openings arranged therearound in a direction transverse to the longitudinal axis thereof, said exhaust openings and said inlet openings being arranged to overlap one another in the direction of the longitudinal axis of the cylinder, and in a direction transverse thereto.

2. An internal-combustion engine, which comprises, in combination, a cylinder and a piston arranged to reciprocate in said cylinder, said cylinder having exhaust openings arranged therearound in a direction transverse to the longitudinal axis thereof, and so shaped that a substantially continuous exhaust opening is formed around the said cylinder at that point in the path of the piston where the exhaust opening is initially uncovered, said cylinder also having inlet openings arranged therearound in a direction transverse to the longitudinal axis thereof, and so shaped as to overlap the said exhaust opening in the direction of the longitudinal axis of the said cylinder.

3. An internal-combustion engine, as claimed in claim 2, in which the inlet openings are situated below and in close proximity to that point in the path of the piston where it initially uncovers the exhaust opening.

4. An internal-combustion engine, as claimed in claim 2, in which the exhaust openings converge downwardly, and inlet openings situated between the exhaust openings are also arranged to diverge downwardly.

5. An internal-combustion engine, as claimed in claim 2, in which a continuous fluid blanket is arranged to be directed past the delivery end of the said exhaust openings.

6. An internal-combustion engine, as claimed in claim 2, in which the inlet and exhaust openings are so arranged that they are fully uncovered by the piston when the same reaches its lower dead centre.

7. An internal-combustion engine, as claimed in claim 2, in which the inlet ports are arranged to communicate with a pre-compression chamber by a series of transfer passages, which are isolated from the exhaust openings.

8. An internal-combustion engine, as claimed in claim 2, in which the exhaust openings and the inlet openings are isolated from one another by an annulus provided with two sets of notches, one set arranged to communicate with the exhaust openings, and the other set arranged to communicate with the inlet openings.

In witness whereof I have hereunto set my hand.

ARTHUR WILLIAM WALL.